US009300345B2

(12) United States Patent
Johnson et al.

(10) Patent No.: US 9,300,345 B2
(45) Date of Patent: Mar. 29, 2016

(54) CONDUCTIVE CASE FOR ELECTRONIC CAMERA DEVICE

(71) Applicants: Joseph M. Johnson, San Luis Obispo, CA (US); Verent Chan, San Luis Obispo, CA (US)

(72) Inventors: Joseph M. Johnson, San Luis Obispo, CA (US); Verent Chan, San Luis Obispo, CA (US)

(73) Assignee: Really Right Stuff, LLC, San Luis Obispo, CA (US)

( * ) Notice: Subject to any disclaimer, the term of this patent is extended or adjusted under 35 U.S.C. 154(b) by 0 days.

(21) Appl. No.: 14/247,115

(22) Filed: Apr. 7, 2014

(65) Prior Publication Data

US 2014/0364177 A1 Dec. 11, 2014

Related U.S. Application Data

(60) Provisional application No. 61/809,109, filed on Apr. 5, 2013.

(51) Int. Cl.
*H04M 1/00* (2006.01)
*H04B 1/3888* (2015.01)

(52) U.S. Cl.
CPC .................... *H04B 1/3888* (2013.01)

(58) Field of Classification Search
CPC ........................................ H04M 1/02
USPC ..................................... 455/575.8
See application file for complete search history.

(56) References Cited

U.S. PATENT DOCUMENTS

| 8,204,561 B2* | 6/2012 | Mongan et al. ............ 455/575.8 |
| 8,655,422 B2* | 2/2014 | Stiehl et al. ................ 455/575.8 |
| 2005/0245193 A1* | 11/2005 | Guichard ................ A45C 5/02 455/41.1 |
| 2013/0023313 A1* | 1/2013 | Kim ........................... 455/575.8 |

* cited by examiner

*Primary Examiner* — Nathan Mitchell
*Assistant Examiner* — Sayed T Zewari
(74) *Attorney, Agent, or Firm* — Chernoff Vilhauer McClung & Stenzel, LLP

(57) ABSTRACT

A case for a mobile phone surrounds the periphery of the mobile phone while not substantially surrounding a front of the mobile phone and not substantially surrounding a back of the mobile phone. The case includes four sides that define a substantially rectangular outer periphery around the mobile phone where each of the four sides of the mobile phone is substantially straight for at least 80% of its length.

18 Claims, 8 Drawing Sheets

CONDUCTIVE CASE FOR ELECTRONIC CAMERA DEVICE

CROSS REFERENCE TO RELATED APPLICATIONS

This application claims the benefit of U.S. Provisional App. No. 61/809,109, filed Apr. 5, 2013.

BACKGROUND OF THE INVENTION

The present invention relates to a shell for camera equipment suitable for supporting the camera equipment on a support and, more particularly, to a shell suitable for a enclosing part of a mobile phone suitable for supporting the mobile phone to facilitate flexible secure orientations for obtaining images.

There are numerous mobile phones having a variety of different shapes and configurations. Some mobile phones are generally referred to as flip-phones where the screen flips open from the keypad in a clam-shell manner, such as a Motorola Razor. Some mobile phones have a generally rectangular shape with a display on one face, together with a camera on the same face with the display and/or the opposing face. In addition, some mobile phones include a physical keyboard on one face of the phone (e.g., Blackberry) and/or a slide out keyboard (e.g., Motorola Droid Global), while other phones include a virtual keyboard that is accessible using a touch screen display (e.g., iPhone 4). Securely and safely supporting such phones within a clamp, in a manner similar to traditional standard reflex cameras on a tripod together with a ball head, is problematic.

What is desired therefore is a shell for a phone that permits it to be securely and safely supported by a support.

DETAILED DESCRIPTION OF THE PREFERRED EMBODIMENTS

Figure 1:
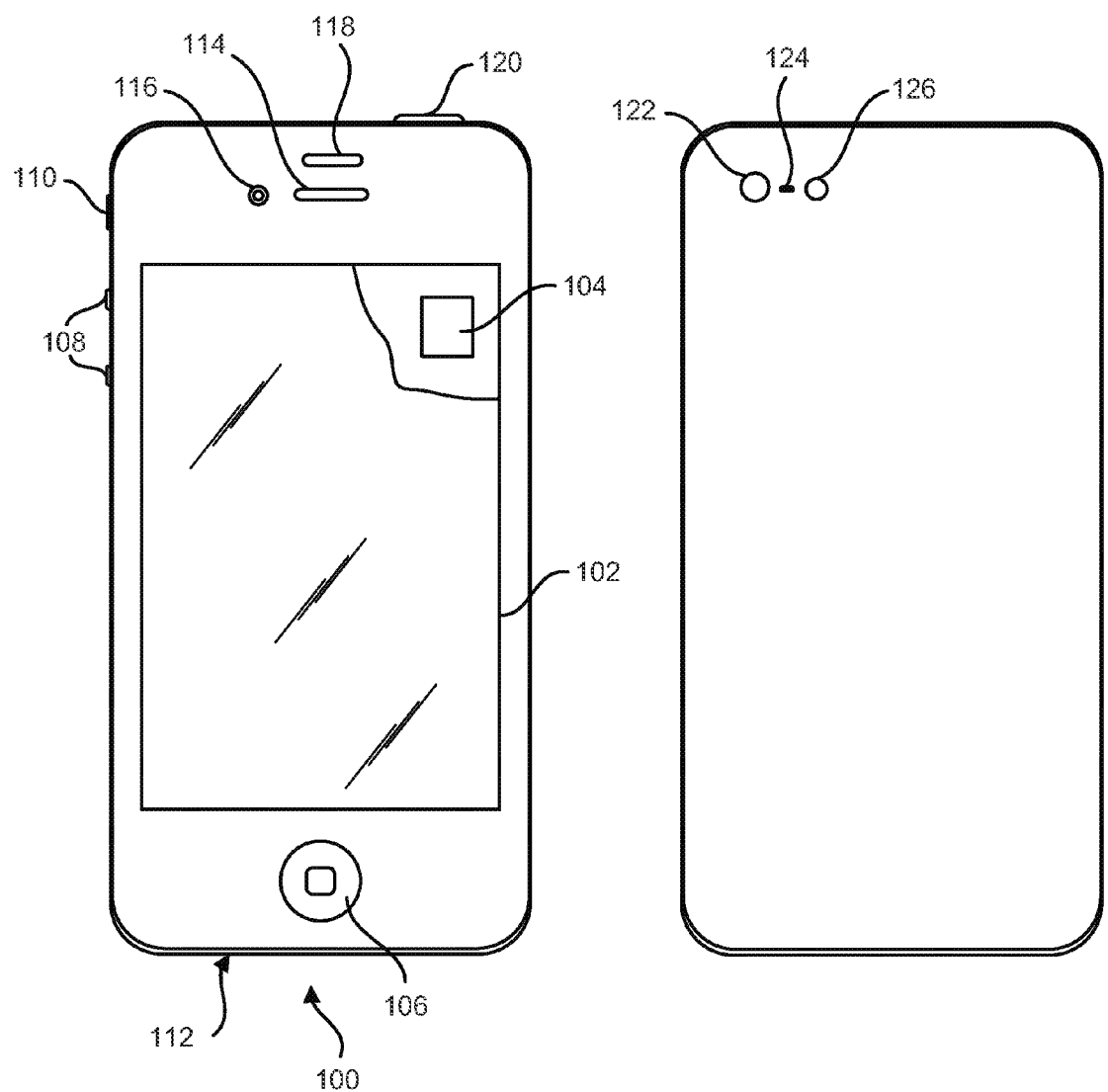
FIG. 1 illustrates a mobile phone that includes a pair of imaging devices.

Referring to FIG. 1, an exemplary mobile phone 100 is illustrated. The mobile phone 100 may include a display region 102, such as a display that is suitable for touch or multi-touch input using its display region 102, to enable interaction with the user of the phone 100. In other cases, the display region 102 does not include a touch screen but rather a keyboard or other input mechanism that is used to interact with the phone. Often multiple applications are available through interaction with the display region 102, such as a camera application 104, that may be used to control the capture of images using the imaging devices included together with the phone 100. The phone may include a "home" button 106 that returns the user back to the main set of interface options on the display 102 from within a running application. The phone may include other buttons, for any suitable function, as desired. The phone may include a pair of volume control buttons 108 that increase or decrease, respectively, the volume from the phone's speakers which primarily emit through the lower surface 112 of the device. The phone may also include a ring/silent switch 110 that silences a received phone call. The lower surface 112 of the device may also include other connectors, such as a headset jack, a bottom microphone, and a computer connector, such as a USB connector and/or a lightning connector. The phone 100 may also include a receiver/front microphone 114, a front camera 116, and a front LED 118. The phone may also include a sleep/wake button 120. The rear of the phone may include a rear camera 122, a rear microphone 124, and a rear LED flash 126. In particular, one or both of the cameras may be operated by the camera application on the phone and/or additional controls included with the phone. The camera application may also select among one or both of the cameras, together with the LED flash, if appropriate.

Figure 2:
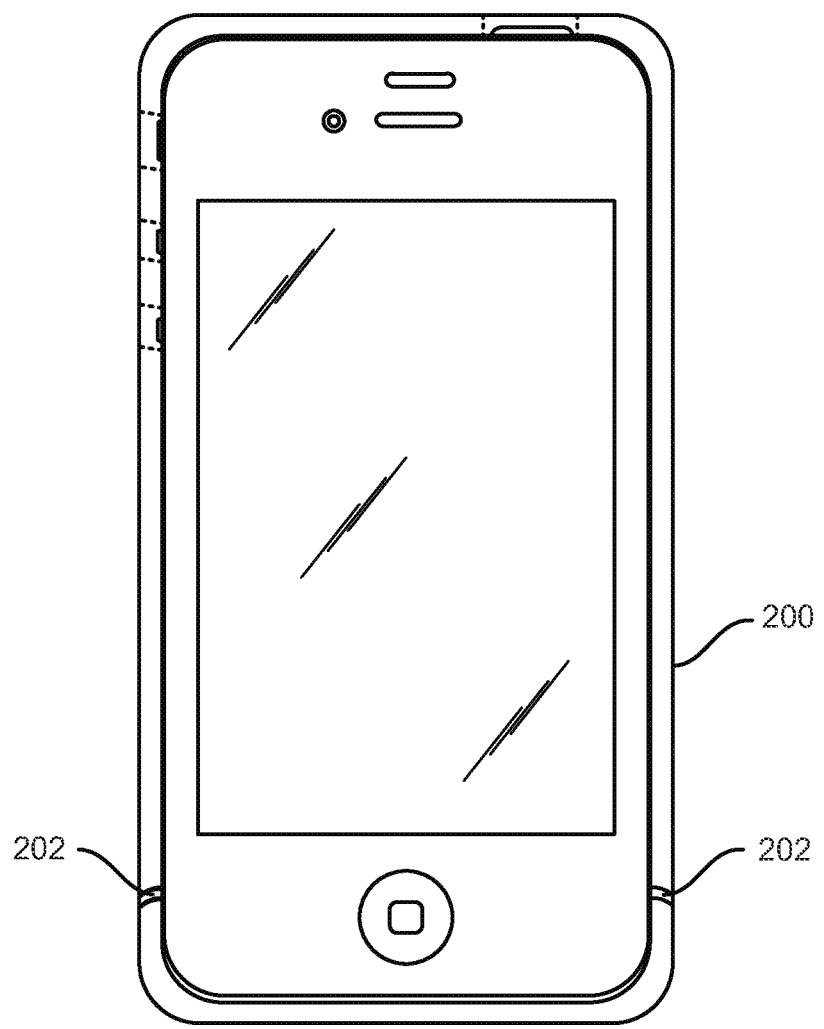
FIG. 2 illustrates the mobile phone of FIG. 1 together with a case surrounding the periphery of the mobile phone.
Figure 3:
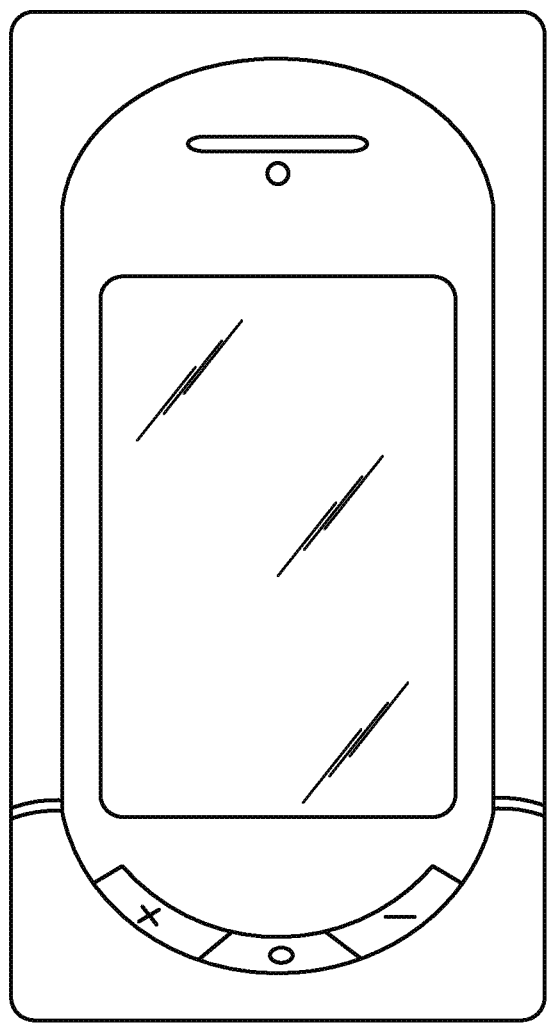
FIG. 3 illustrates another mobile phone together with a case surrounding the periphery of the mobile phone.

Referring to FIG. 2, to enable the phone to be more readily maintained in a desirable orientation on a support, such as a clamp supported by a tripod, it is desirable to include a case 200 that encompasses the peripheral edges of the phone. The case, such as its periphery, is preferably generally rectangular in shape with curved corner regions. Referring also to FIG. 3, in the event that the phone itself is not rectangular, but rather has some other shape such as slightly v-shaped and/or highly curved, then the case may include variable thickness to provide a resulting generally rectangular exterior peripheral shape. The case is preferably made from conductive metal material, such as aluminum, so that it has sufficient strength to be supported by a clamp. In additional, metal tends to be forgiving in the event the phone with the case is dropped or otherwise impacted while taking pictures, so that it merely dents rather than fractures. While the case is preferably constructed from metal, other materials may be used if desired, such as for example, plastic or ceramic materials. Each of the four sides of the case are preferably straight at substantially right angles to each adjacent side so that the phone may be aligned in a support at a horizontal orientation (2 sides) and/or a vertical orientation (2 sides). Further, each of the sides are preferably straight for over 80% of their length, more preferably 90% of their length, more preferably 95% of their length, and more preferably 100% of their length while being interconnected by a curved surface. Having a case that encloses the periphery of the phone, together with the material being conductive, results in a sufficiently rigid case suitable for being supported by a clamp, such as a clamp on a tripod. Such a configuration of the peripheral edges of the case facilitate limited restrictions in where the phone may be supported by an associated clamp. Further, to permit access to a camera on the rear of the phone and/or other items such as a battery compartment (if any), the case preferably does not cover or not substantially cover (e.g., less than 15%, 10%, or 5% of the surface area) a portion of the rear of the mobile device. Further, to permit access to a camera on the front of the phone and/or other items such as the display screen or keyboard (if any), the case preferably does not cover or not substantially cover (e.g., less than 15%, 10% or 5% of the surface area) a portion of the front of the mobile device.

The phone 100 may have its antenna for transmission and/or receiving wireless signals in different locations depending on the configuration of the phone. In some implementations, the antenna is positioned in a location proximate the exterior peripheral surface of the phone. With the antenna positioned along the exterior peripheral of surface of the phone, a conductive case surrounding the exterior peripheral surface of the phone may interfere with the signal quality of the transmission and/or receiving of wireless signals. To alleviate the interference with the signal quality of the transmission and/or receiving of wireless signals one or more non-conductive inserts 202 may be included to break the conductive path around the periphery of the phone. In this manner there is no closed loop conductive path around the periphery of the phone as a result of the case.

The phone 100 may have partial conductive periphery surfaces and/or a conductive front/rear surfaces. In such an event to reduce potential interference with the signal quality of the transmission and/or receiving the interior surface of the case may include a non-conductive coating and/or an interface insulating layer so that the conductive case is not directly electrically connected to conductive portions of the phone.

Figure 4:
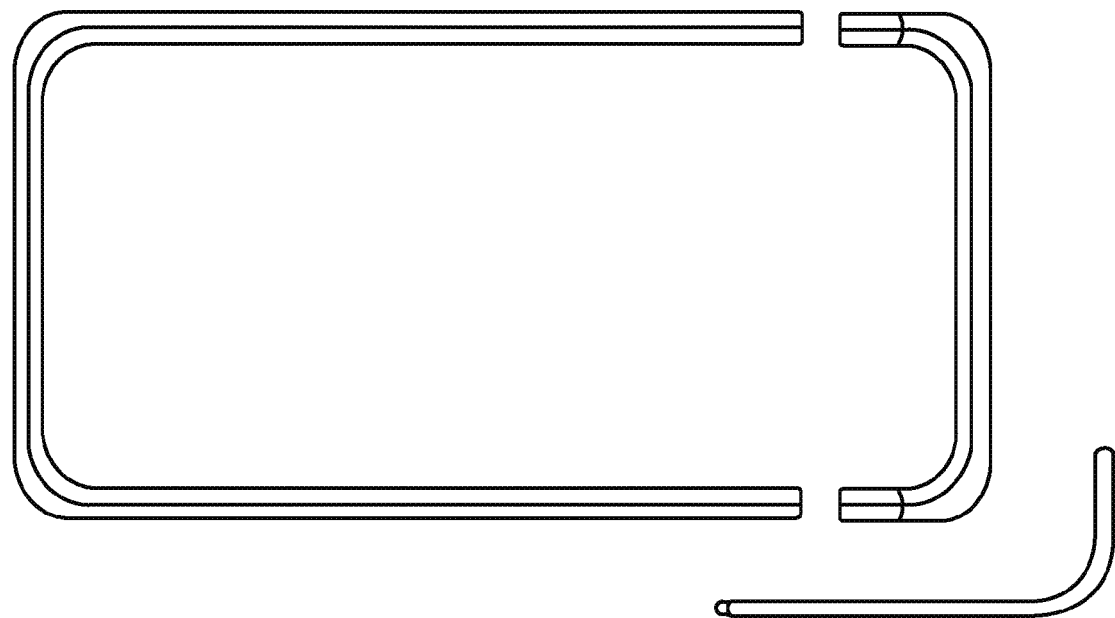
FIG. 4 illustrates the case of FIG. 2 for the mobile phone of FIG. 1.
Figure 5:
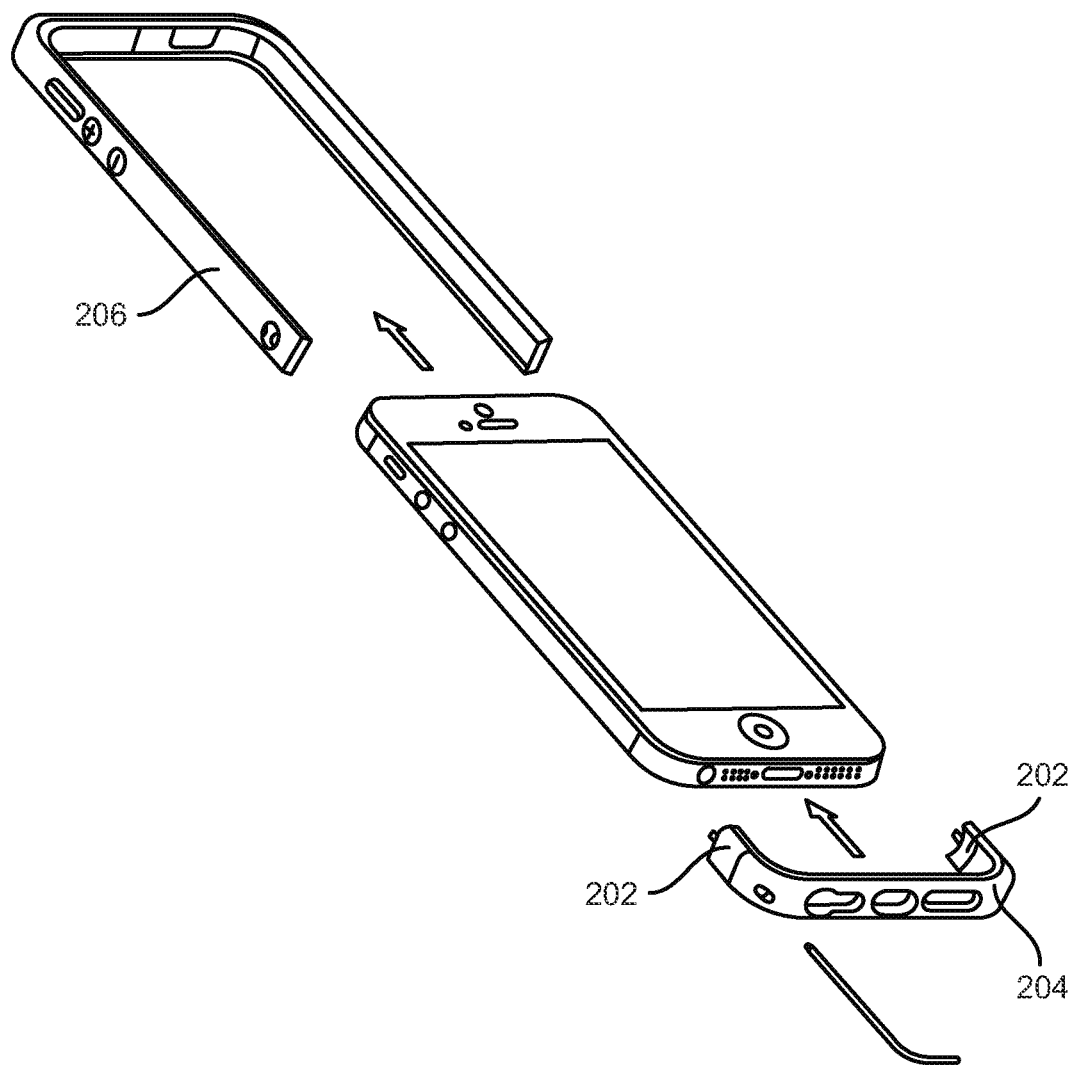
FIG. 5 illustrates two portions of the case of FIG. 4 together with the mobile phone of FIG. 1.
Figure 6:
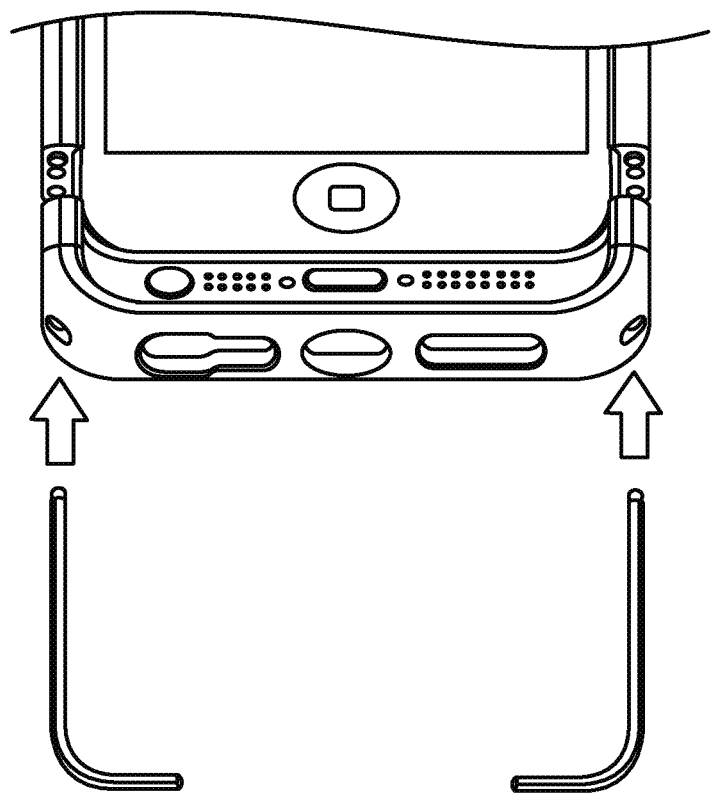
FIG. 6 illustrates the securement of the two portions of the case of FIG. 4

Referring to FIG. 4, the case may be configured in the form of a split conductive case that is selectively secured together with a non-conductive material between the two portions of the case. The non-conductive material is included between the two portions of the case to maintain structure integrity. By including the non-conductive structural bridge, the conductive loop that would have otherwise been constructed by the case, which would otherwise degrade the transmission and/or reception of electromagnetic signals, is reduced. Referring to FIG. 5, to secure the two portions together, a plurality of conductive fasteners are preferably used at each joint, although non-conductive fasteners may be used. One fastener attaches the non-conductive structural bridge 202 to one half 204 of the case. Referring also to FIG. 6, the other fastener attaches the non-conductive structural bridge 202 to the other half 206 of the case in a direction parallel to but opposite to that of the first fastener's axis and direction, respectively. By counter boring the non-conductive structural bridge 202 for the head of each conductive fastener, the fasteners do not conductively bridge the connection. This facilitates a structural tying of the two conductive portions of the case together, while maintaining full conductive isolation. Further, by staggering the fastener positions the non-conductive structural bridge may be reduced in size, both in width and in length. A similar result may be achieved by utilizing a long section of non-conductive material down the length of the shell with fasteners at both ends, however, this tends to decrease the structural rigidity.

Figures 7A, 7B, 7C:
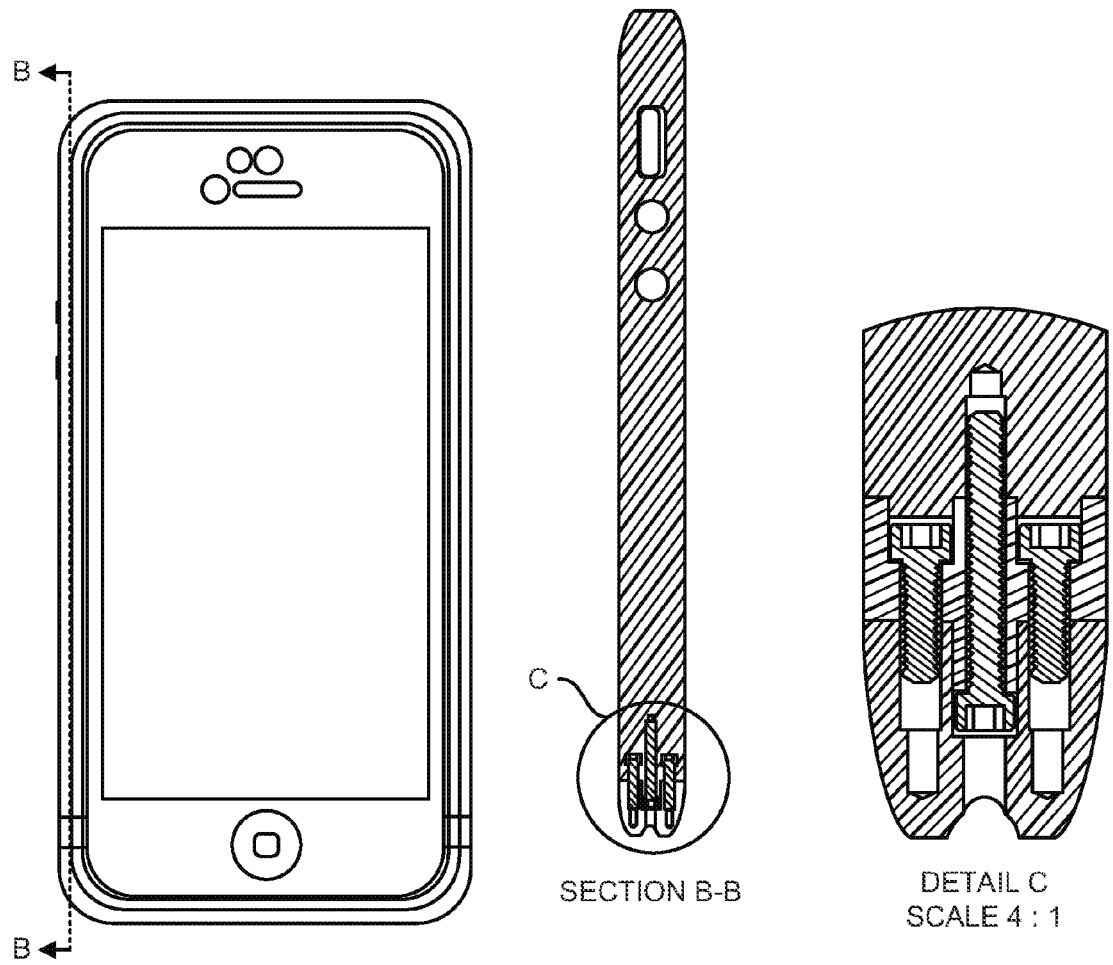
FIGS. 7A-7C illustrates a cross-sectional view of the fasteners for the two portions of the case.

Referring to FIGS. 7A-7C, another modified securement structure includes the use of three conductive fasteners to increase the structural rigidity. Two of the fasteners may operate in one direction while the third fastener, preferably with more resistance to pull out, operates in the other direction. By increasing the counter bore for the heads of each fastener, locating bosses may be added to reduce the degrees of freedom from the joints and to increase accurate alignment. For example, a boss may protrude from one side, and the counter bore for the fastener head and boss may be located in the conductive shell. The non-conductive boss may be larger in diameter than the fastener head to ensure no contact is made between the fastener and the shell.

The hole is preferably slightly larger than the required tool bit to provide the user with access to the fastener head for tightening and loosening. In some cases, the hole may be designed to restrict access or such that a specialized tool is used. To increase the compatibility with different tools, the non-conductive material may be placed close to the bottom edge of the case. Having the hole smaller than the fastener head but large enough for the tool keeps the fasteners captive and reduces the likelihood of losing the fastener. By including the screw isolated and pre-assembled to the shell portion with the hole, the customer of the case only needs to screw the pre-assembled shell portion and isolator to the other shell portion using the fastener head access hole. Another advantage of the extended boss is that it lengthens the distance between the head of the fastener and the thread engagement on the shell. Doing so allows more stretch to the fastener and more compression to the isolator, helping maintain preload on the fastener.

Figure 8:
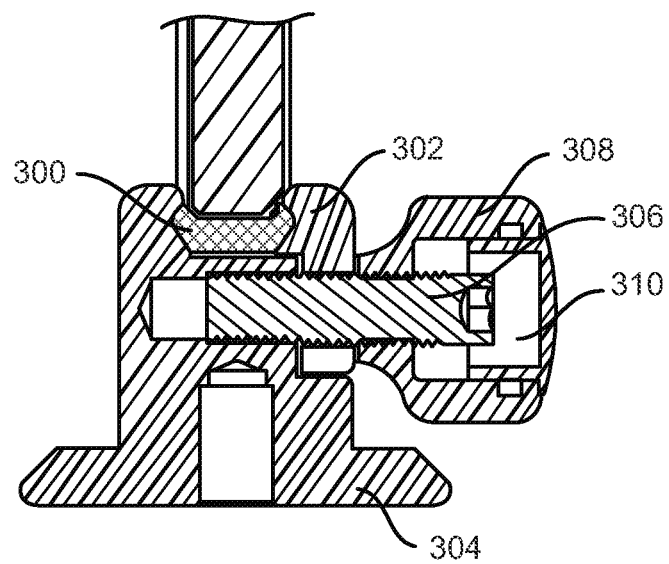
FIG. 8 illustrates a sectional view of a clamping system for the phone of FIG. 7A-7C.

Referring to FIG. 8, the shell is preferably shaped in such a manner that a clamp can be used to grab and secure any straight edge by the use of multiple dovetailed features. The dovetail is shaped such that the clamp can securely fasten to one edge of the case instead of having to grab both edges. This offers the user the flexibility of mounting the clamp on any portion of the straight edges. For the avid photographer, this offers a number of advantages. For one, when using tripod gear, photographers are able to center the lens of the camera on the phone directly above the center of rotation. This becomes particularly advantageous when using the camera to produce panoramic images. Second, being able to clamp along any of the straight edges increases the positions that the phone can be mounted. This can increase the creative flexibility by allowing photographers to mount closer or further away from the camera. Also, the clamp can be shifted easily to a position that is not obstructing many functions of the phone, such as the headphone jack, docking connector, speakers, microphones, volume buttons, silent switch, and/or power button. By utilizing a screw-knob style clamp, the user can quickly take the clamp on and off while not being worried that the clamp will fall off, which has increased likelihood when using friction-based clamping mechanisms. Even in adverse or dangerous conditions, the user can ensure adequate clamping force is provided to keep the phone secured. Further, clamping to the edge of the shell prevents damage to the phone itself from over-tightening the clamp because the force is applied to the shell only, thus not pinching the entire phone's width, length, or thickness.

As illustrated in FIG. 8, the clamp includes the case 300 that is secured by a clamp jaw 302 that is movable with respect to a clamp body 304. A threaded clamp stud 306 is secured to the clamp body 304. A knob 308 is secured to a knob cap 310 which is rotatably connected to the clamp stud 306. By rotating the knob 308 the clamp jaw 302 is secured to the shell 300. The clamp jaw 302 is secured to the shell 300 rather than the mobile phone itself, which reduces the likelihood of the mobile phone being damaged by excessive pressure on the mobile device.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

We claim:
1. A case for a mobile phone comprising:
(a) said case suitable to surround the periphery of said mobile phone while not substantially surrounding a front of said mobile phone and not substantially surrounding a back of said mobile phone;

(b) said case including four sides including a top side, a bottom side, a left side, and a right side, that collectively define a substantially rectangular outer periphery around said mobile phone;

(c) each of said four sides of said mobile phone is substantially straight for at least 80% of its length;

(d) a major portion of said rectangular outer periphery being constructed from a conductive material and a minor portion of said rectangular outer periphery being constructed from a non-conductive material, wherein said rectangular outer periphery does not form a conductive loop;

(e) said major portion of said rectangular outer periphery having an upper portion configured to wrap around a front part of said mobile phone and a lower portion configured to wrap around a back part of said mobile phone;

(f) said upper portion having a first pair of flat inclined exterior surfaces with a first flat portion defined therebetween, where said first pair of flat inclined exterior surfaces are inclined with respect to one another;

(g) said lower portion having a second pair of flat inclined exterior surfaces with a second flat portion defined therebetween, where said second pair of flat inclined exterior surfaces are inclined with respect to one another;

(h) said upper portion having a matching shape to said lower portion.

2. The case of claim 1 wherein each of said four sides is interconnected with another respective pair of said four sides with a curved corner.

3. The case of claim 1 wherein said case has a variable thickness.

4. The case of claim 1 wherein said case has a substantially uniform thickness.

5. The case of claim 1 wherein said case is conductive.

6. The case of claim 5 wherein said case includes an insulating layer suitable to maintain said conductive case from being directly electrically connected to a conductive exterior peripheral surface of said mobile phone.

7. The case of claim 1 wherein each of said four sides of said mobile phone is substantially straight for at least 90% of its length.

8. The case of claim 1 wherein each of said four sides of said mobile phone is substantially straight for at least 95% of its length.

9. The case of claim 1 wherein each of said four sides of said mobile phone is substantially straight for 100% of its length.

10. The case of claim 5 wherein said case includes a non-conductive portion separating two individual conductive portions of said case in such a manner that said case does not form a conductive loop around said mobile phone.

11. The case of claim 10 wherein said case includes two individual portions separated by a pair of said non-conductive portions.

12. The case of claim 10 wherein said non-conductive portion is secured between said two individual conductive portions using, a first fastener securing said non-conductive portion to a first one of said two conductive portions, a second fastener securing said non-conductive portion to a second one of said two conductive portions.

13. The case of claim 12 wherein said non-conductive portion said secured between said two conductive portions using a third fastener.

14. The case of claim 12 wherein said first fastener and said second fastener are both conductive.

15. The case of claim 14 wherein said first fastener and said second fastener do not conductively bridge said non-conductive portion.

16. The case of claim 12 wherein said first fastener and said second fastener are elongate and are secured in parallel but opposite directions with respect to one another.

17. The case of claim 1 wherein said mobile phone has a rear side, such that no more than 15% of the rear is covered by said case.

18. The case of claim 1 wherein said mobile phone has a front side, such that no more than 15% of the front side is covered by said case.

* * * * *